US010250937B2

(12) United States Patent
Pantos et al.

(10) Patent No.: US 10,250,937 B2
(45) Date of Patent: Apr. 2, 2019

(54) ITEM TO ITEM TRANSITIONS

(71) Applicant: Apple Inc., Cupertino, CA (US)

(72) Inventors: Roger N. Pantos, Cupertino, CA (US); James D. Batson, Saratoga, CA (US); Simon Ezriel Chaim Goldrei, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 323 days.

(21) Appl. No.: 14/503,057

(22) Filed: Sep. 30, 2014

(65) Prior Publication Data

US 2015/0350717 A1    Dec. 3, 2015

Related U.S. Application Data

(60) Provisional application No. 62/005,499, filed on May 30, 2014.

(51) Int. Cl.
*G06F 17/30* (2006.01)
*H04N 21/43* (2011.01)
(Continued)

(52) U.S. Cl.
CPC ... *H04N 21/4307* (2013.01); *G06F 17/30053* (2013.01); *G06F 17/3074* (2013.01); *G06F 17/30581* (2013.01); *G06F 17/30781* (2013.01); *G06F 17/30864* (2013.01); *H04N 21/43* (2013.01); *H04N 21/435* (2013.01); *H04N 21/4382* (2013.01); *H04N 21/44008* (2013.01); *H04N 21/462* (2013.01); *H04N 21/4825* (2013.01)

(58) Field of Classification Search
CPC ......... G06F 17/30864; G06F 17/30321; G06F 17/30613

USPC ......................................................... 707/741
See application file for complete search history.

(56) References Cited

U.S. PATENT DOCUMENTS 8,632,410 B2    1/2014  Perlman et al.
2009/0024234 A1*  1/2009  Archibald ............ G11B 27/038
                                                                        700/94
(Continued)

FOREIGN PATENT DOCUMENTS

EP          1193983 A2    4/2002
GB          2479455 A    10/2011
WO      2011/055274 A1    5/2011

OTHER PUBLICATIONS

Bo Gao, Jack Jansen, Pablo Cesar, Dick CA. Bulterman, "Beyond the playlist: seamless playback of structured video clips" IEEE Transactions on Consumer Electronics (vol. 56, Issue: 3, Aug. 2010).*

(Continued)

*Primary Examiner* — Hosain T Alam
*Assistant Examiner* — Robert F May
(74) *Attorney, Agent, or Firm* — Baker & Hostetler LLP

(57) ABSTRACT

Systems and methods for transitioning between media assets are described. In the described techniques, a client device may receive and render a first plurality of coded segments corresponding to a first media asset. Subsequently, while rendering the first media asset, the client device may receive a second plurality of coded segments corresponding to a second media asset. In order to transition between the media assets, a starting point for the rendering of the second media asset is determined.

14 Claims, 7 Drawing Sheets

(51) Int. Cl.
*H04N 21/435* (2011.01)
*H04N 21/462* (2011.01)
*H04N 21/438* (2011.01)
*H04N 21/44* (2011.01)
*H04N 21/482* (2011.01)

(56) References Cited

U.S. PATENT DOCUMENTS

| | | | |
|---|---|---|---|
| 2011/0004330 A1* | 1/2011 | Rothkopf | G11B 27/105 700/94 |
| 2011/0113335 A1* | 5/2011 | Rouse | G11B 27/034 715/723 |
| 2011/0252118 A1* | 10/2011 | Pantos | G06F 17/30053 709/219 |
| 2013/0044803 A1* | 2/2013 | Fisher | H04N 21/2343 375/240.02 |
| 2013/0291031 A1 | 10/2013 | Dow et al. | |
| 2013/0332969 A1 | 12/2013 | Stewart et al. | |
| 2014/0036023 A1 | 2/2014 | Croen et al. | |
| 2014/0310597 A1* | 10/2014 | Triplett | H04L 12/28 715/716 |

OTHER PUBLICATIONS

Bo Gao, Jack Jansen, Pablo Cesar, Dick CA. Bulterman, "Beyond the playlist: seamless playback of structured video clips" IEEE Transactions on Consumer Electronics ( vol. 56, Issue: 3, Aug. 2010) (Year: 2010).*

International Search Report and Written Opinion, dated Aug. 12, 2015, from corresponding International Application No. PCT/US2015/032160, filed May 22, 2015.

International Patent Application No. PCT/US2015/032160; Int'l Preliminary Report on Patentability; dated Dec. 15, 2016; 9 pages.

* cited by examiner

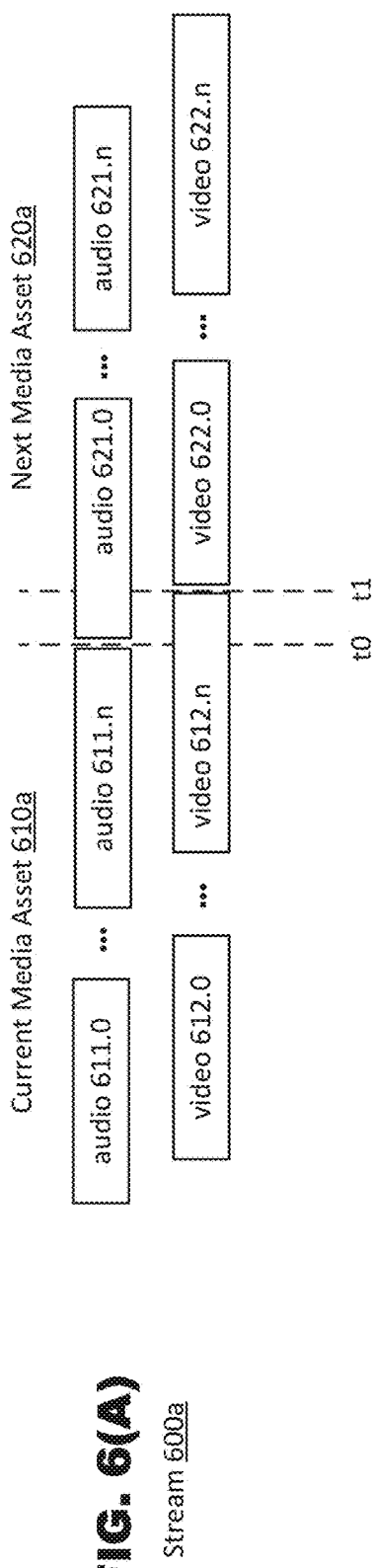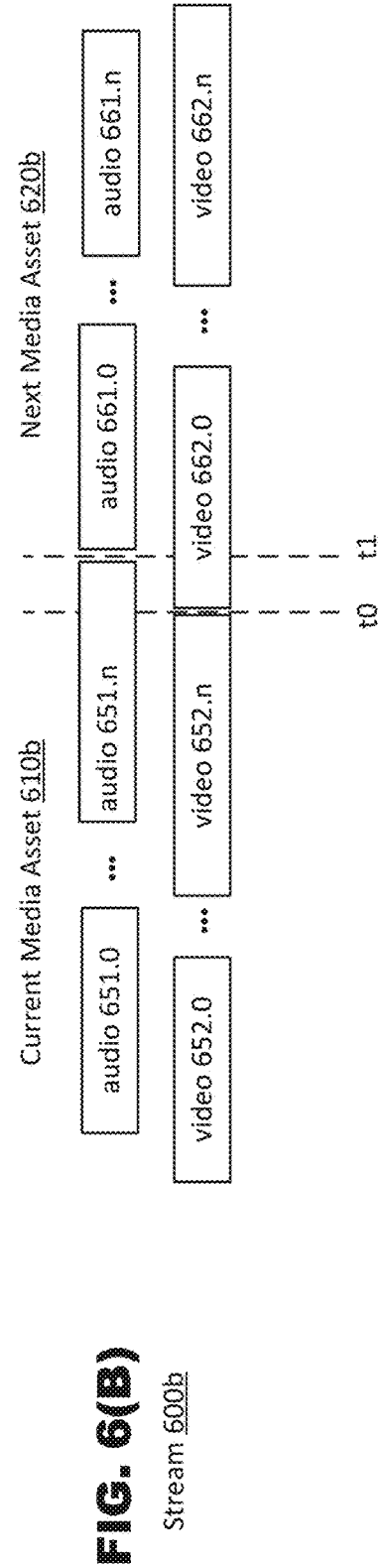

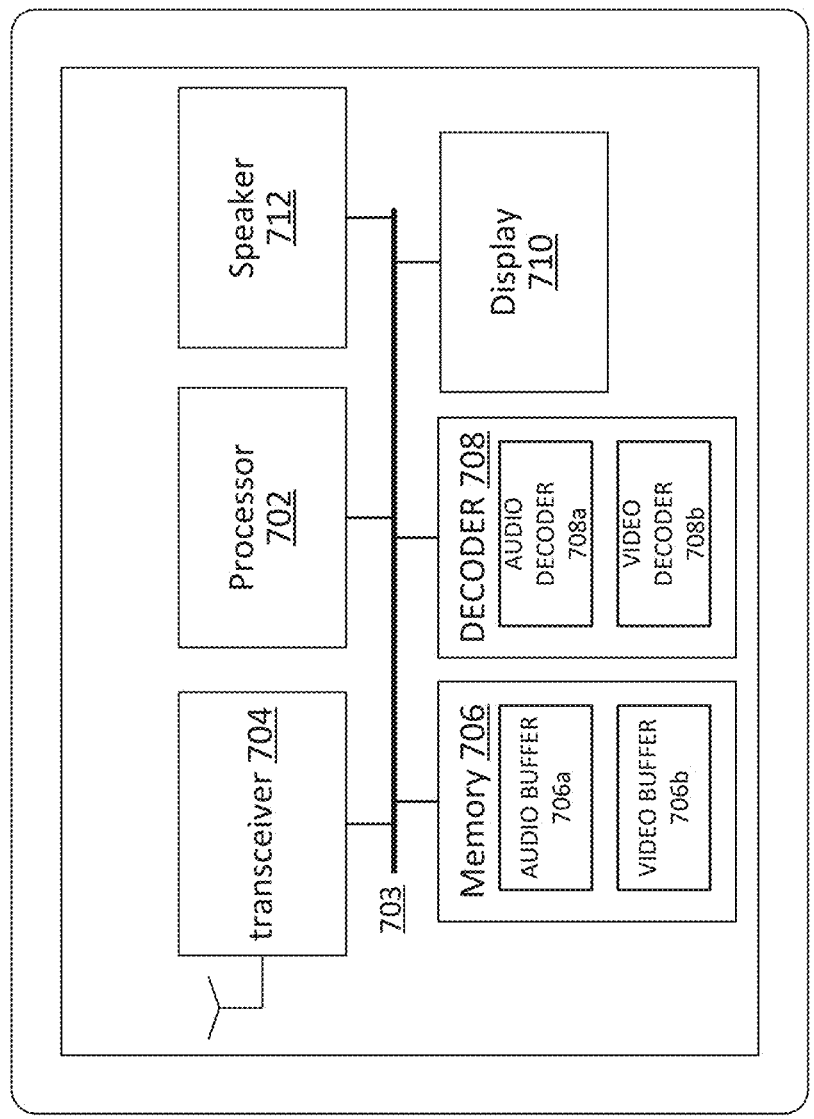

ITEM TO ITEM TRANSITIONS

CROSS-REFERENCE TO RELATED APPLICATIONS

The present application claims priority to U.S. Provisional Application No. 62/005,499 filed May 30, 2014, the entirety of which is incorporated by reference herein.

BACKGROUND

The present invention generally relates to streaming digital media and, in particular, to systems and methods for rendering multiple video assets and transitioning between them with minimal disruption.

Streaming media assets (e.g., audio and/or video streams) from a remote server to a client device over a communication network is an increasingly popular way for retrieving and viewing various media. Example media assets include both an individual media asset and a media channel having back-to-back media assets. Such streaming is prevalent, for example, in video-on-demand ("VOD") and HTTP Live Streaming ("HLS") services. Media assets may be retrieved by a client device from one or more distribution servers. One or more content servers may be connected to each distribution server, providing media assets to be transmitted to client devices.

During playback, however, transitions between media assets often produce gaps, skips, pops, and/or other perceptible disturbances. Such perceptible disturbances may originate from coding techniques implemented by coding server(s) associated with a content server. For example, a distribution server may receive coded segments from a coding server. A coding server encodes (e.g., segments) media assets, and transmits the coded media segments to a distribution server. However, a typical coding server merely encodes media assets without tracking whether the resulting encoded segments correspond to one or multiple media assets. As a result, a client device must determine whether one or multiple media assets are being received from the distribution sever.

When a coding server provides a distribution server with coded segments for a single media asset, the requesting client device may easily decode the media asset. However, when a coding server supplies segments including multiple media assets (e.g., data representing a feed from a cable channel having multiple media assets), problems arise. Among these problems, the client device may have difficulty identifying segments corresponding to each of the media assets. As a result, perceptible disturbances frequently occur.

As existing approaches fail to provide smooth transitions between media assets, the inventors have developed improved systems and methods for switching between multiple streams of encoded media.

BRIEF DESCRIPTION OF THE DRAWINGS

FIGS. 6A and 6B illustrate other media streams divided into synchronized audio and video segments according to example embodiments.

FIG. 7 illustrates a simplified schematic view of an example client device according to an example embodiment.

DETAILED DESCRIPTION

Figure 1:
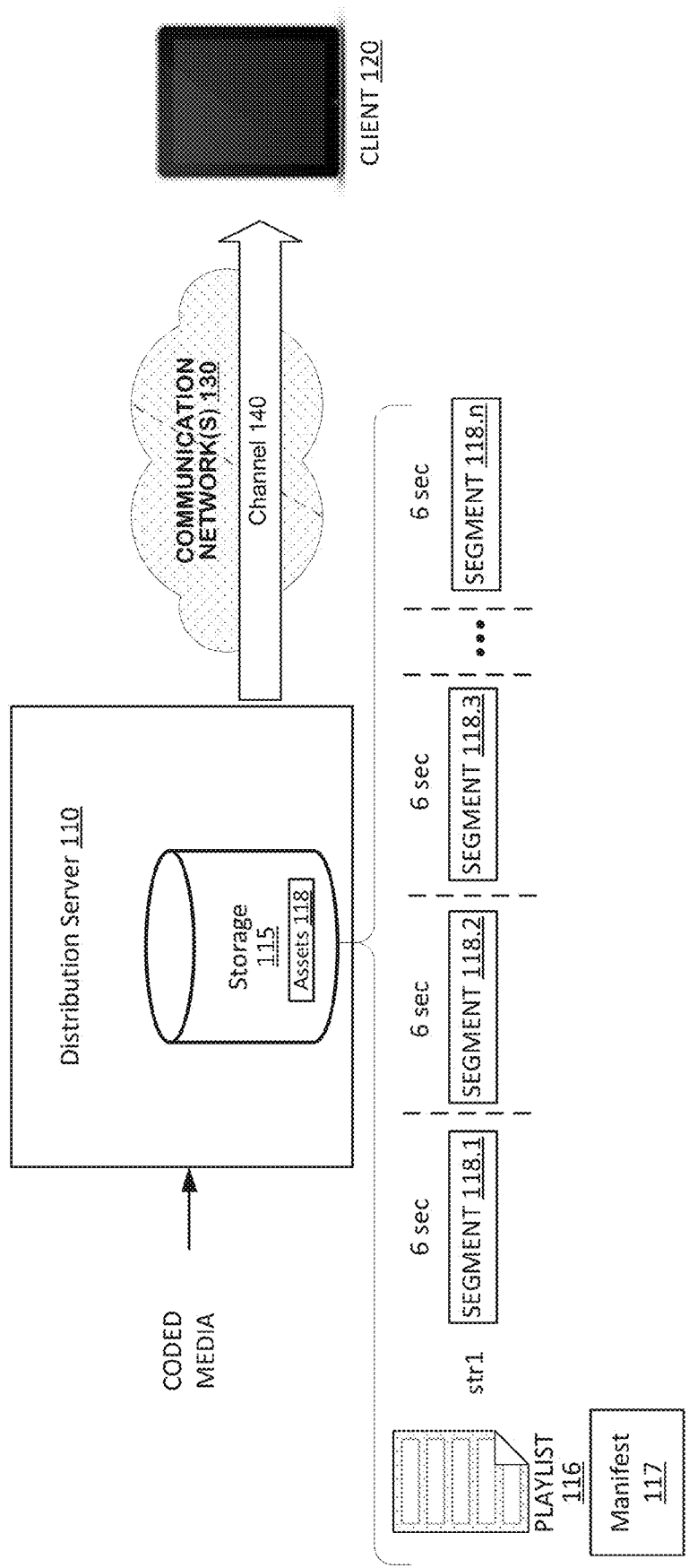
FIG. 1 illustrates a simplified block diagram of an example media distribution system suitable for use with the present invention.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Systems and methods for seamlessly switching between multiple media assets during streaming playback are disclosed. For example, a client device receiving streaming playback of a media asset may seamlessly switch between media assets without any appreciable gaps, pauses, drop-offs, distortions, and/or other perceptible abnormalities.

In the described embodiments, a client device may receive and render a first plurality of coded segments corresponding to a current media asset. Subsequently, while rendering the current media asset, the client device may receive a second plurality of coded segments corresponding to a next media asset. In order to transition between the media assets, a starting point for rendering of the next media asset is determined. In some embodiments, the starting point is during a mixed segment containing portions of the current and next media assets. Alternatively, some embodiments further include cross-fading between the current and next media assets at the starting point.

Prior to discussing specific example embodiments, descriptions of some terms are now provided for a better understanding of the descriptions set forth herein.

A "media asset" may refer to any audio media, video media, or a combination of audio and video media. Example media assets include songs, videos, advertisements, television shows, etc. A media asset may be adapted to any format and may contain pre-recorded or live-streaming content. A media asset may be locally or remotely stored. In the case of remotely stored media assets, their location may be specified by uniform resource identifiers (URIs) and such media assets may be accessed over a communications network.

A "playlist" may refer to a collection of media assets. Typically, a playlist file contains an ordered list of media asset URIs and associated information tags. A playlist file also may be accessible by a URI, and may adopt various formats, such as .m3u or .m3u8 playlist types. A playlist file may be stored at a distribution server. Thus, to render the contents of a playlist file, a distribution server may transmit the listed media assets to a client device. The content of the playlist may be user-defined, generated based on user habits, or may be generated by a content provider. The duration of playback for playlist files may vary greatly, ranging from minutes to days, weeks, or longer.

"HLS" refers to the HTTP Live Streaming protocol available from Apple Inc. of

Cupertino, California. HLS is an HTTP based media streaming communications protocol that typically operates by segmenting streams into smaller HTTP-based segments. Although HLS is described as an example embodiment, the invention is not limited to any particular streaming service.

FIG. 1 illustrates a simplified block diagram of an example media distribution system 100 suitable for use with the present invention.

The system 100 may include a distribution server 110 and a client device 120 connected via a communication network 130. The distribution server 110 may include a storage system 115 that may store a variety of media streams (e.g., music, movies, television shows, advertisements, etc.), such as str1, for download by the client device 120. The distribution server 115 may transmit media streams to the client device 120 via the network 130 in response to client requests. For example, the streaming media may be pre-stored at distribution server 115, as media assets 118. In another example, "live streamed" data may be stored at distribution server 115 on a real-time basis.

One or more media assets 118 may be stored, within the storage system 115. Media assets 118 may be transmitted as a plurality of streams (e.g., str1), each stream having a plurality of coded media segments (e.g., segments 118.1-118.n). Each media stream may be coded at a respective bitrate, frame rate, and/or frame size. In the illustrated embodiment, each of the plurality of segments 118.1-118.n may include media content of a predetermined duration (e.g., six seconds). Although not shown, the distribution server 110 may store multiple copies of a particular media stream, especially video media streams.

In addition, each of the plurality of segments 118.1-118.n may contain frames coded by a predetermined protocol. In some embodiments, the segments 118.1-118.n may be formatted and/or transmitted to a requesting client device 120 in accordance with the HLS protocol. Alternatively, or in addition, video data in each segment 118.1-118.n may be coded according to ITU-T H.265 (commonly "HEVC"), H.264, H.263 or other standard or proprietary protocols. Coded video data typically is coded according to predictive coding techniques that exploit spatial and/or temporal redundancy in a source video sequence. Accordingly, frames of a source video sequence may be coded according to intra-prediction techniques (I-coding) or inter-prediction techniques (often, P- and/or B-coding).

The storage system 115 may also store one or more playlists 116 and one or more manifest files 117. Playlist 116 indicates particular compilations of media assets 118 for playback. For example, a media channel having a plurality of back-to-back media assets may be provided by playlist 116. Current and next media assets of a media channel may originate from common content and/or coding servers. Manifest file 117 may identify segments by a network location resource such as a URL. For each media asset 118, manifest file 117 may provide configuration information for associated streams str1 (e.g., bitrate, size, etc.). Manifest file 117 also may correlate segments of coded video with corresponding segments having varying bitrates (not shown).

The client device 120 may be any electronic device. The client device may include a media player adapted to download streaming media from the distribution server 110. The distribution server 110 may transmit media to the client device 120 via channel 140 and communication network 130. The client device 120 decodes the downloaded segments such that they may be rendered for playback.

In some embodiments, the client device 120 may identify segments corresponding to one or more media assets. Upon receiving a new media asset, the client device 120 may reset its rendering clock (not shown) based upon the received audio and video streams of a new media asset. Here, the client device 120 may determine a synchronized point in the audio and video segments of the new media asset. Audio and video segments of a new media asset also may be aligned to a common time base to ensure synchronization. The new media asset may be rendered starting from the synchronization point. In some instances, an end portion of the previous media asset and a start portion of the subsequent media asset may be incorporated into a single segment (e.g., 118.n). Alternatively, the end of a media asset may correspond to the end of a media segment.

Client device 120 may determine the precise point of handoff between the two media assets and cross-fade between them. A mixer (not shown) may be used to cross-fade the media assets by ramping down volume of a current media asset from 1.0 to 0.0 over the period of n seconds, where 1.0 represents maximum volume, and 0.0 represents zero volume. Simultaneously, the mixer can ramp up the next media asset's volume from 0.0 to 1.0 over the same period of n seconds. In some embodiments, n can be on the order of 20 ms. According to various embodiments, cross-fading between media assets may utilize any suitable cross-fading function. As an alternative to cross-fading between media assets, audible artifacts may be minimized by decoding the next media asset using the decoder of the current media asset.

Although the client device 120 is illustrated as a tablet computer in FIG. 1, client devices may be provided as a variety of computing platforms, including smartphones, personal computers, laptop computers, media players, set-top boxes, wearable electronic devices, other servers, and/or dedicated video conferencing equipment. The network 130 represents any number of networks that convey coded video data among the distribution server 110 and the client device 120, including, for example, wireline and/or wireless communication networks. A communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless discussed herein.

FIG. 1 illustrates a simplified implementation of media distribution system 100. The example architecture depicted in FIG. 1 may be expanded to accommodate multiple distribution servers, client devices, communications networks, etc. In some implementations, it is permissible to provide some servers as dedicated media coding servers and other servers as dedicated media transmission servers.

Figure 2:
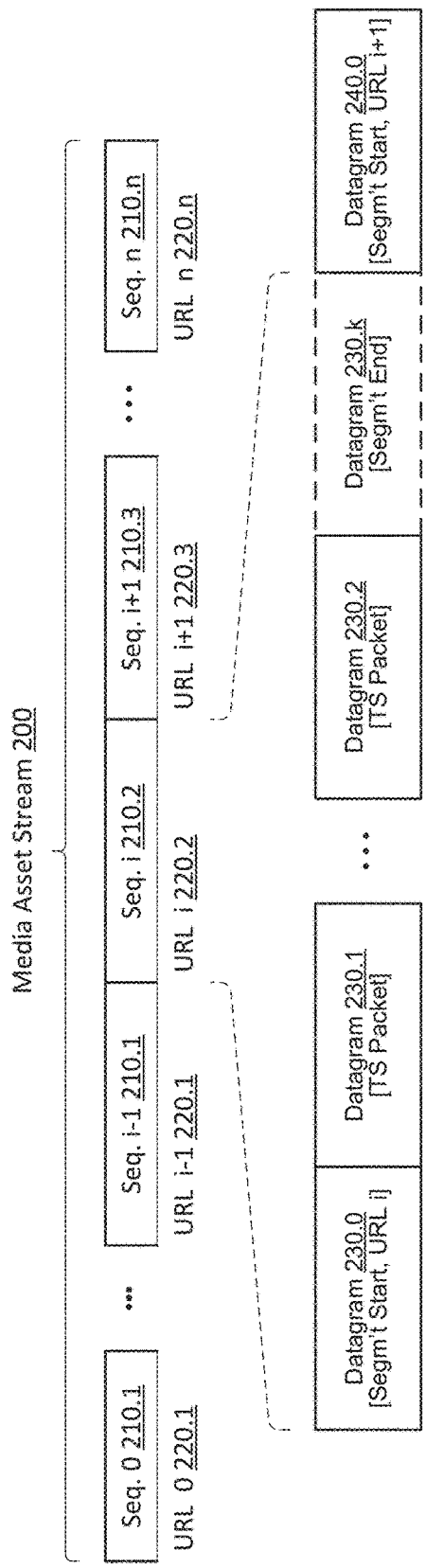
FIG. 2 illustrates a coding architecture for a media asset stream according to an example embodiment.

FIG. 2 illustrates a coding architecture for a media asset stream 200 according to an example embodiment.

The media asset stream 200 may be represented as a sequence of individual segments 210.1 to 210.n. The source media asset stream 200 sequence may be parsed into a plurality of coded segments 210.1-210.n that may be stored within storage 115 of the distribution server 110. For example, each segment may be stored by the distribution server 110 at locations that can be referenced by URIs 220.1-220.n.

Each of the coded segments 210.1-210.n may include a plurality of datagrams 230.0-230.k. The datagrams may operate according to a protocol, such as HLS, in which a first datagram 230.0 within a segment 210.2 includes a control code indicating the start of a new segment. The datagram 230.0 also may include data representing an originating URI of the segment 210.2 as stored by the distribution server 110. In some instances, a client device 120 may utilize source data, such as an originating URI, to determine that current and next media assets originate from the same content and/or coding servers. In addition, one of the datagrams may contain a timestamp (e.g., indicating time/date that the media asset was generated) and/or a sequence number indicating the location of a particular segment within a media asset or stream. The client device 120 may also utilize timestamps (e.g., similarly formatted timestamps) to determine that current and next media assets originate from the same content and/or coding servers. Other datagram(s) 230.1-230.k within the segment 210.2 may include content data (e.g., audio and video) of the segment 210.2. Optionally, a final datagram 230.k may include a control code indicating termination of the segment 210.2. Alternatively, the start-of-segment of a next segment (e.g., datagram 240.0 for segment 210.3) may indicate termination of a prior segment 210.2.

Figure 5:
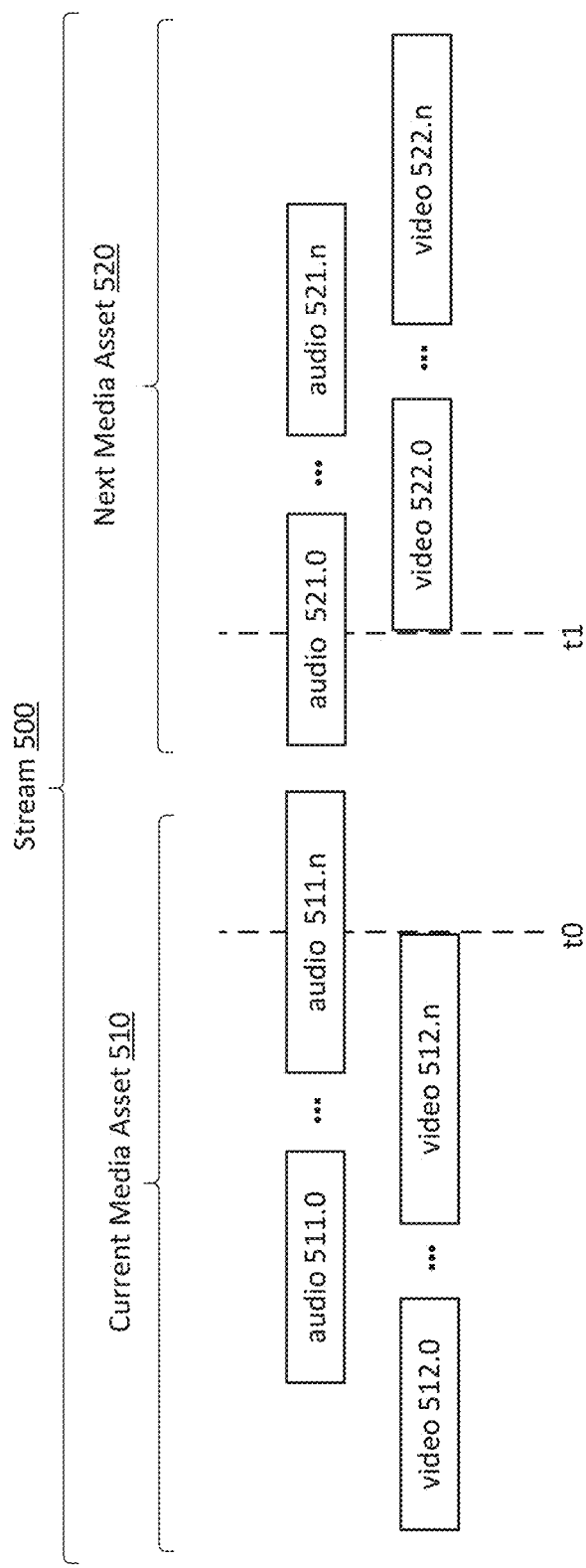
FIG. 5 illustrates a media stream divided into synchronized audio and video segments according to an example embodiment.

Some media assets may include separate audio and video streams (e.g., stream 500 of FIG. 5). Here, each of the separate audio and video streams may include respective timestamp(s) or sequence number(s). Accordingly, client device 120 may determine a common synchronization point between in the audio and video segments of a media asset. Using the synchronization point, the media player of the client device 120 may render the media asset.

Figure 3:
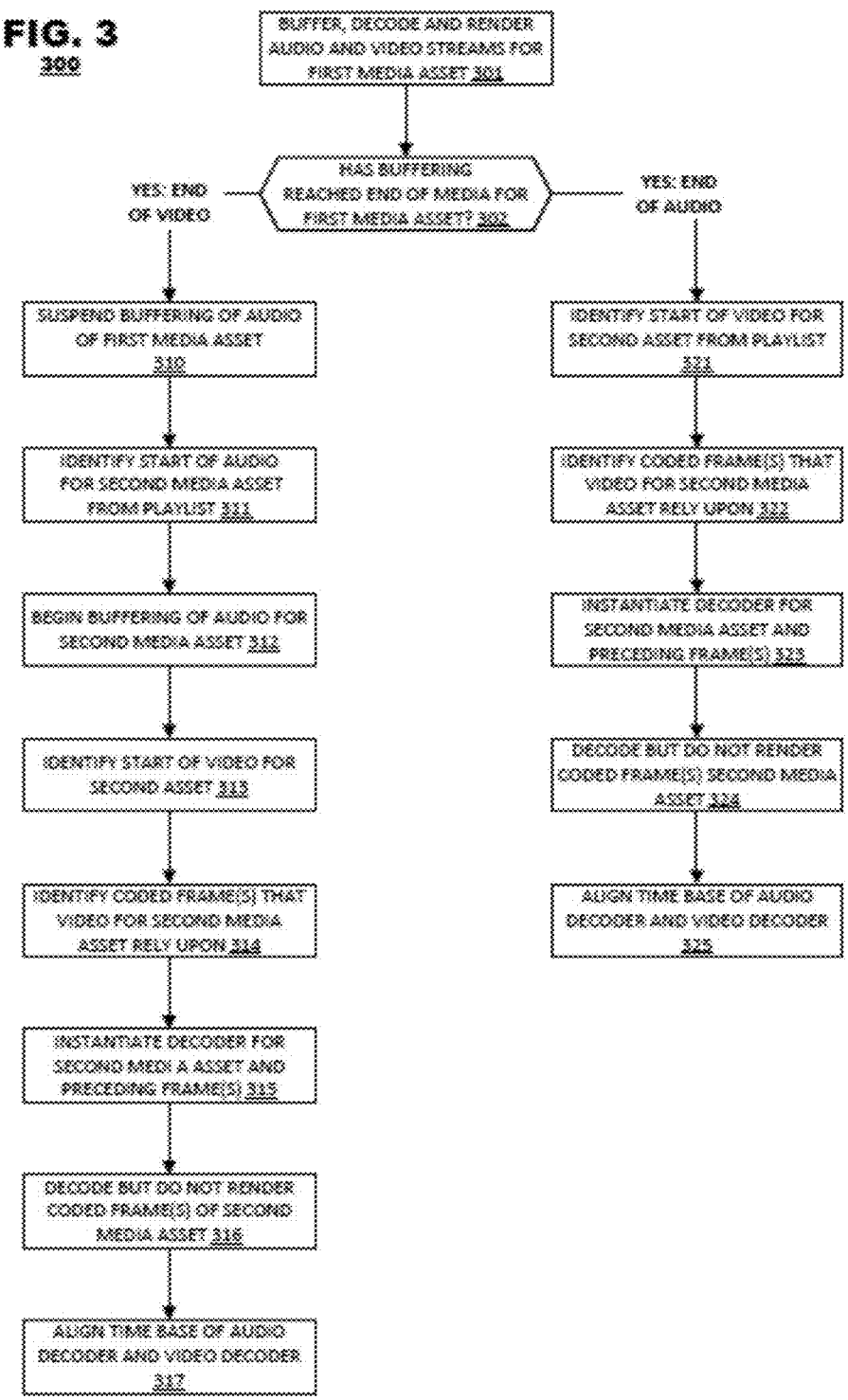
FIG. 3 illustrates a method for switching between media assets according to an example embodiment.

FIG. 3 illustrates a method 300 for switching between media assets according to an example embodiment.

At 301, a media player of a client device may buffer, decode, and render audio and/or video streams of a current media asset. Next, at 302, the client device may determine whether the current media asset has been buffered such that it may be locally stored at the client device. As audio and video streams of a media asset may be separately encoded, their respective end segments may not coincide. For example, one of the audio or video streams of a media asset may terminate first.

When the video stream of a current media asset ends first, the client device may suspend buffering of the audio stream of a current media asset, at 310. Next, at 311, the client device may identify a starting audio segment for a next media asset. For example, the client device may utilize timestamp(s) or sequence number(s) within the audio stream to identify a starting audio segment of a next media asset. After the starting audio segment of a next media asset is determined, the client device may begin buffering the audio stream for a next media asset, at 312. For example, a next media asset may be the following media asset listed in playlist 116.

At 313, the client device may identify the starting video segment for the next media asset. Here, the client device may identify one or more coded frames (e.g., I-frames) that video frames of a next media asset rely upon, at 314. Next, at 315, an audio decoder and one or more video decoders of the client device are initiated. For example, video decoders may be initialized using an I-frame.

At 316, audio and video segments of a next media asset may be decoded (but not yet rendered) by the client device. In some instances, only a subset of video frames may be decoded. For example, one or more I-frames may be decoded. Using decoded audio and video segments, the client device may determine a common synchronization point between audio and video streams of a next media asset, at 317. Audio and video segments of a next media asset also may be aligned to a common time base to ensure synchronization. The synchronization point may be used by the client device as a starting point to render the next media asset.

When the audio stream of a current media asset ends first, the client device may identify a start of video for a next media asset, at 321. For example, a next media asset may be the following media asset in playlist 116. Here, the client device may identify one or more coded frames (e.g., I-frames) that video frames of a next media asset rely upon, at 322. Next, at 323, an audio decoder and one or more video decoders of the client device are initiated. For example, video decoders may be initialized using an I-frame.

At 324, the audio and video segments of a next media asset may be decoded (but not yet rendered) by the client device. Using the decoded audio and video segments, the client device may determine a common synchronization point between in the audio and video streams of as next media asset, at 325. Audio and video segments of a next media asset also may be aligned to a common time base to ensure synchronization. The synchronization point may be used by the client device as a starting point to render the next media asset Upon completion of the rendering of the current media asset, the client device may begin rendering the next media asset. The client device may determine the precise point of handoff between the two media assets and cross-fade between them. Any suitable cross-fading technique (e.g., linear, logarithmic, parabolic, and/or exponential functions) may be used. In some instances, the client device may discard a small number of segments in advance of the synchronization point in order to avoid a perceptible disturbance.

Figure 4:
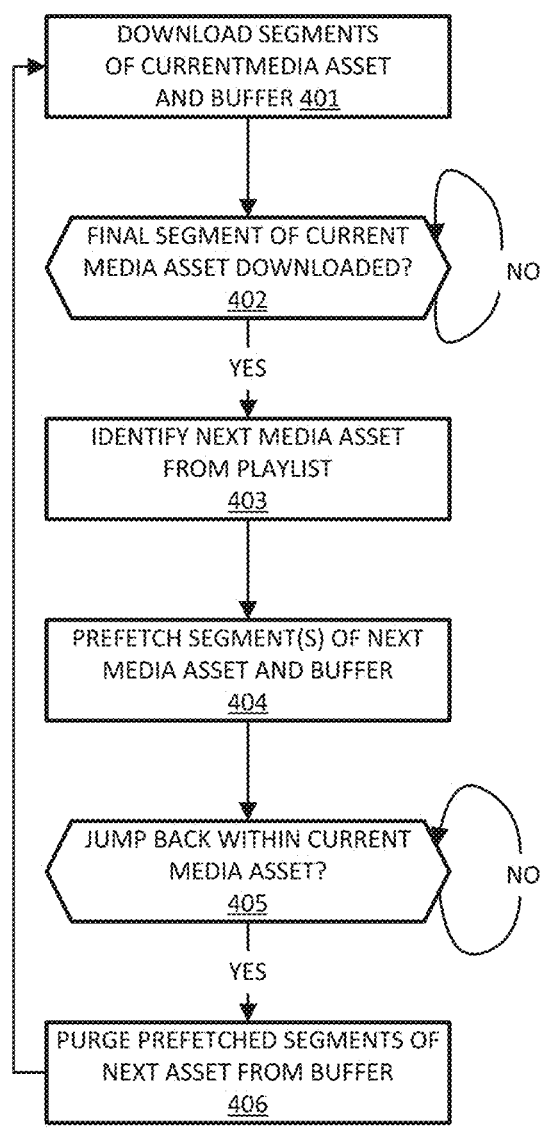
FIG. 4 illustrates another method for switching between media assets according to an example embodiment.

FIG. 4 illustrates another method 400 for switching between media assets according to an example embodiment.

At 401, the client device downloads segments of a current media asset. As the client device receives segments of a current media asset from distribution server 110, the downloaded segments are buffered such that they may be locally stored at the client device. Next, at 402, the client device determines whether a final segment of a current media asset has been downloaded. If not, the client device continues downloading and buffering the current media segment. If the final segment of a current media asset has been downloaded, the client device identifies a next media asset from playlist 116, at 403.

While the current media asset is being rendered, the client device may pre-fetch audio and video segments of the next media asset, at 404. The downloaded segments of the next media assets also may be buffered such that they may be locally stored at the client device.

A user may desire to jump back to an earlier point in time within a current media asset. In these instances, the client device detects a user's return to an earlier point, at 405. If not, the client device continues rendering the current media segment. If the user jumps back to an earlier point, the client device purges the pre-fetched segments of the next media asset from its buffer, at 406.

FIG. 5 illustrates a media stream 500 divided into synchronized audio and video segments according to an example embodiment.

As shown in FIG. 5, the media stream 500 includes a current media asset 510 and a next media asset 520. Each of the current and next media assets 510, 520 are divided into synchronized audio and video segments including current audio and video segments 511, 512 and next audio and video segments 521, 522.

As discussed above, audio and video streams of a media asset may be separately encoded. As a result, their respective end segments may not coincide. When audio or video segments of the current media asset 510 end, the client device may terminate playback of the current media asset 510, at time t0. Here, the client device may continue playback of the current media asset 510 so long as audio and video segments are available for rendering. Time t0 denotes a point in time when either of the audio or video segments can no longer be played back. Thereafter, the client device may determine a synchronized point, t1, in audio and video segments of the next media asset 520. Time t1 denotes a point in time when both the audio and video segments are available for playback. Accordingly, the client device may begin rendering of audio and video segments of the next media asset 520, starting at synchronized point t1. In some instances, as discussed above, the current and next media assets can be cross-faded by the client device.

FIGS. 6A and 6B illustrate other media streams divided into synchronized audio and video segments according to example embodiments.

As shown in FIG. 6, each of media streams 600a and 600b includes a current media asset 610a, 610b and a next media asset 620a, 620b. Each of the current and next media assets 610, 620 are divided into synchronized audio and video segments including current audio and video segments 611, 612, 651, 652 and next audio and video segments 621, 622, 661, 662. The difference between the embodiments depicted in FIGS. 6A and 6B is whether the audio or video segment of the current media asset 610a, 610b terminates first. In the embodiment shown in FIG. 6A, the audio segment 611.n terminates before the corresponding video segment 612.n. By contrast, in the embodiment shown in FIG. 6B, the video segment 652.n terminates before the corresponding audio segment 651.n.

As shown in FIG. 6A, when the audio segment 611.n terminates before the corresponding video segment 612.n, the client device may terminate playback of the current media asset 610a, at time t0. Here, time t0 denotes the end of audio segments for the current media asset (i.e., segment 611.n). In addition, the client device may determine a synchronized point, t1, in audio and video segments of the next media asset 620a. Time t1 denotes a point in time when both the audio and video segments of the next media asset are available for playback. Accordingly, the client device may begin rendering of audio and video segments of the next media asset 620a, starting at synchronized point t1. In some instances, the audio and video segments of the next media assets may need to be aligned to a common time base to ensure synchronization.

Similarly, as shown in FIG. 6B, when the video segment 652.n terminates before the corresponding audio segment 651.n, the client device may client device may terminate playback of the current media asset 610b, at time t0. Here, time t0 denotes the end of video segments for the current media asset (i.e., segment 611.n). In addition, the client device may determine a synchronized point, t1, in audio and video segments of the next media asset 620b. Again, time t1 denotes a point in time when both the audio and video segments of the next media asset are available for playback. Accordingly, the client device may begin rendering of audio and video segments of the next media asset 620b, starting at synchronized point t1.

In both FIGS. 6A and 6B, the client device begins decoding segments of the next media asset from the synchronized point t1. To begin decoding of another media asset, the client device may decode an earlier instantaneous decoder refresh (IDR) frame to refresh the state of the decoder. For example, one or more decoders may be initialized for another media asset by decoding coded segments between a synchronized point and the immediately preceding IDR frame. An IDR frame may be transmitted from the distribution server 110 on 2-5 second intervals. Accordingly, the client device may decode an earlier IDR frame and any intervening frames.

FIG. 7 is a simplified schematic view of a client device 700 according to an example embodiment.

Client device 700 may include a processing system 702, transceiver 704, memory 706, decoder 708, display 710, and speaker 712. The client device 700 may also include a bus 703 that may provide a data transfer path for transferring data and/or power, to, from, or between various other components of client device 700.

Processing system 702 may control the operation of components within client device 700. For example, processing system 702 may determine a synchronized point in the audio and video segments of the new media asset. In another example, processing system 702 may align audio and video segments of a new media asset to a common time base to ensure synchronization. In another example, processing system 702 may execute instructions for one or more applications, including media streaming applications, stored in memory 706.

Transceiver 704 may be provided to enable the client device 700 to communicate with one or more other electronic devices or servers (e.g., distribution server 110) using any suitable communications protocol. For example, transceiver may support Wi-Fi (e.g., an 802.11 protocol), Ethernet, Bluetooth, high frequency systems (e.g., 900 MHz, 2.4 GHz, and 5.6 GHz communication systems), infrared, transmission control protocol/internet protocol ("TCP/IP"), hypertext transfer protocol ("HTTP"), real-time transport protocol ("RTP"), real-time streaming protocol ("RTSP"), and other standardized or propriety communications protocols, or combinations thereof.

Memory 706 stores the operating system OS of the client device 700 as well as one or more applications. Included among the applications may be a streaming application service. Memory 706 may include one or more audio buffers 706a and video buffers 706b.

In the various implementations, memory 706 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 706 may include cache memory, which may be one or more different types of memory used for temporarily storing data for electronic device applications. Memory 706 may store media assets (e.g., music, image, and video files), software, firmware, preference information (e.g., media playback preferences), wireless connection information, subscription information (e.g., information that tracks podcasts, television shows, or other media a user subscribes to), etc.

Decoder 708 may decode downloaded media segments in accordance with standard and/or proprietary protocols. Decoder 708 may include an audio decoder 708a and one or more video decoders 708b. In some embodiments, downloaded segments may be decoded in accordance with the HLS protocol. Alternatively, or in addition, downloaded segments may be decoded in accordance with ITU-T H.265 (commonly "HEVC"), H.264, H.263 or other standard or proprietary protocols.

Electronic device 700 may also include one or more output components including display(s) 710 and speaker(s) 712. Output components may render information (e.g., audio and video) to a user of device 700. An output component of client device 700 may take various forms, including, but not limited, to audio speakers, headphones, visual displays, etc. For example, display 710 may include any suitable type of display or interface for presenting visible information to a user of client device 700. In some embodiments, display assembly 710 may include an embedded or coupled display. Display assembly 710 may include, for example, a touch screen, a liquid crystal display ("LCD"), a light emitting diode ("LED") display, an organic light-emitting diode ("OLED") display, or any other suitable type of display.

In some embodiments, one or more components of electronic device 700 may be combined or omitted. Moreover, electronic device 700 may include additional components not depicted in FIG. 7. Client device 700 may be any stationary or portable electronic device, including tablet computers, smartphones, laptop computers, personal computers, set-top boxes, wearable electronic devices, and other consumer electronic products designed to decode and render coded media assets.

It will be apparent to those skilled in the art that various modifications and variations can be made in the system and method for item to item transitions of the present invention without departing form the spirit or scope of the invention. Thus, it is intended that the present invention cover the modifications and variations of this invention provided they come within the scope of the appended claims and their equivalents.

The invention claimed is:

1. A method for transitioning between a plurality of media assets originating from a common media source, the method comprising:
   rendering at least a portion of a first media asset contained in an audio stream and a video stream from a media source, the audio stream comprising audio segments and the video stream comprising video segments;
   upon detection of a transition from the first media asset to a second media asset in one of the audio stream and the video stream during the rendering of the first media asset, decoding portions of the audio stream and the video stream that contain respective onsets of content of the second media asset;
   determining a termination point of the first media asset, wherein the termination point is a point when either of audio segments of the audio stream or video segments of the video stream related to the first media asset can no longer be played back,
      wherein when the termination point is a point in the audio stream, the video stream still contains at least a portion of a video segment related to the first media asset that can be played back, and
      wherein when the termination point is a point in the video stream, the audio stream still contains at least a portion of an audio segment related to the first media asset that can be played back;
   determining a starting point of the second media asset, wherein the starting point is a common synchronization point when both audio segments of the audio stream and video segments of the video stream contain content of the second media asset that are available for playback;
   shifting a rendering time of the synchronization point of the second media asset to a rendering time at the termination point of the first media asset;
   rendering the second media asset at the shifted rendering time; and
   discarding from rendering:
      portions of the audio or video stream related to the first media asset following the determined termination point; and
      portions of the audio or video stream related to the second media asset preceding the determined starting point of the second media asset.

2. The method according to claim 1, wherein the one or more decoders are initialized between the starting point and an instantaneous decoder refresh frame relied upon by a frame of the second media asset at the starting point.

3. The method according to claim 1, wherein the audio and video streams containing the second media asset are realigned to a common timebase with respect to the audio and video segments of the second media asset.

4. The method according to claim 1, further comprising cross-fading audio segments of the first and second media assets at the starting point.

5. The method according to claim 1, wherein the common synchronization point is identified based upon timestamps of the first and second media assets.

6. A non-transitory computer readable medium storing a media streaming application for transitioning between a plurality of media assets originating from a common media source, the media streaming application executable by at least one processing system, the media streaming application comprising instructions for:
   rendering at least a portion of a first media asset contained in an audio stream and a video stream from a media source, the audio stream comprising audio segments and the video stream comprising video segments;
   upon detection of a transition from the first media asset to a second media asset in one of the audio stream and the video stream during the rendering of the first media asset, decoding portions of the audio stream and the video stream that contain respective onsets of content of the second media asset;
   determining a termination point of the first media asset, wherein the termination point is a point when either of audio segments of the audio stream or video segments of the video stream related to the first media asset can no longer be played back,
      wherein when the termination point is a point in the audio stream, the video stream still contains at least a portion of a video segment related to the first media asset that can be played back, and
      wherein when the termination point is a point in the video stream, the audio stream still contains at least a portion of an audio segment related to the first media asset that can be played back;
   determining a starting point of the second media asset, wherein the starting point is a common synchronization point when both audio segments of the audio stream and video segments of the video stream contain content of the second media asset that are available for playback;
   shifting a rendering time of the synchronization point of the second media asset to a rendering time at the termination point of the first media asset;
   rendering the second media asset at the shifted rendering time; and discarding from rendering:
 portions of the audio or video stream related to the first media asset following the determined termination point; and
 portions of the audio or video stream related to the second media asset preceding the determined starting point of the second media asset.

7. The non-transitory computer readable medium according to claim 6, wherein the one or more decoders are initialized between the starting point and an instantaneous decoder refresh frame relied upon by a frame of the second media asset at the starting point.

8. The non-transitory computer readable medium according to claim 6, wherein the audio and video streams containing the second media asset are realigned to a common timebase with respect to the audio and video segments of the second media asset.

9. The non-transitory computer readable medium according to claim 6, further comprising cross-fading audio segments of the first and second media assets at the starting point.

10. The non-transitory computer readable medium according to claim 6, wherein the common synchronization point is identified based upon timestamps of the first and second media assets.

11. An electronic device comprising:
a processing system; and
memory storing one or more programs for execution by the processing system, the one or more programs including instructions for:
 rendering at least a portion of a first media asset contained in an audio stream and a video stream from a media source, the audio stream comprising audio segments and the video stream comprising video segments;
 upon detection of a transition from the first media asset to a second media asset in one of the audio stream and the video stream during the rendering of the first media asset, decoding portions of the audio stream and the video stream that contain respective onsets of content of the second media asset;
 determining a termination point of the first media asset, wherein the termination point is a point when either of audio segments of the audio stream or video segments of the video stream related to the first media asset can no longer be played back,
 wherein when the termination point is a point in the audio stream, the video stream still contains at least a portion of a video segment related to the first media asset that can be played back, and
 wherein when the termination point is a point in the video stream, the audio stream still contains at least a portion of an audio segment related to the first media asset that can be played back;
 determining a starting point of the second media asset, wherein the starting point is a common synchronization point when both audio segments of the audio stream and video segments of the video stream contain content of the second media asset that are available for playback;
 shifting a rendering time of the synchronization point of the second media asset to a rendering time at the termination point of the first media asset;
 rendering the second media asset at the shifted rendering time; and
 discarding from rendering:
  portions of the audio or video stream related to the first media asset following the determined termination point; and
  portions of the audio or video stream related to the second media asset preceding the determined starting point of the second media asset.

12. The method according to claim 1, further comprising:
 determining the termination point of the first media asset by identifying a de-synchronization point between portions of the audio stream and the video stream that contain content of the first media asset.

13. The non-transitory computer readable medium according to claim 6, further comprising:
 determining the termination point of the first media asset by identifying a de-synchronization point between portions of the audio stream and the video stream that contain content of the first media asset.

14. The electronic device according to claim 11, further comprising:
 determining the termination point of the first media asset by identifying a de-synchronization point between portions of the audio stream and the video stream that contain content of the first media asset.

* * * * *